US011811552B2

(12) United States Patent
Herrmann et al.

(10) Patent No.: US 11,811,552 B2
(45) Date of Patent: Nov. 7, 2023

(54) METHOD AND DEVICE FOR PROCESSING DATA ASSOCIATED WITH A MESSAGE RECEIVED VIA A COMMUNICATIONS SYSTEM

(71) Applicant: Robert Bosch GmbH, Stuttgart (DE)

(72) Inventors: Benjamin Herrmann, Ludwigsburg (DE); Mario Gonzalez Fernandez, Ingersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 5 days.

(21) Appl. No.: 17/445,526

(22) Filed: Aug. 20, 2021

(65) Prior Publication Data
US 2022/0094568 A1 Mar. 24, 2022

(30) Foreign Application Priority Data

Sep. 18, 2020 (DE) .......................... 102020211719.5

(51) Int. Cl.
*H04L 12/40* (2006.01)
(52) U.S. Cl.
CPC .... *H04L 12/4015* (2013.01); *H04L 12/40071* (2013.01); *H04L 12/40104* (2013.01)

(58) Field of Classification Search
CPC ......... H04L 12/40071; H04L 12/40104; H04L 12/4015; H04L 63/1425
See application file for complete search history.

(56) References Cited

U.S. PATENT DOCUMENTS

| 9,380,070 B1* | 6/2016 | Cain ...................... H04L 67/12 |
| 2015/0358351 A1* | 12/2015 | Otsuka .................... H04L 12/66 726/23 |
| 2017/0324675 A1* | 11/2017 | Takada .................... H04L 47/34 |
| 2020/0120119 A1* | 4/2020 | Kalra .................. H04L 63/1425 |

OTHER PUBLICATIONS

Tindell, K, Burns, A., and Wellings, A.J. Calculating Controller Area Network (CAN) Message Response Times. 1995. Control Eng. Practice, vol. 3, No. 8, pp. 1163-1169. (Year: 1995).*

* cited by examiner

*Primary Examiner* — Stephen J Clawson
(74) *Attorney, Agent, or Firm* — NORTON ROSE FULBRIGHT US LLP; Gerard Messina

(57) ABSTRACT

A computer-implemented method for processing data, which are associated with at least one message received via a communications system, such as a bus system. The method includes: determining a first variable, which characterizes a transmitting time of the at least one message; evaluating the first variable with regard to at least one time frame of possible transmitting times of the at least one message.

10 Claims, 6 Drawing Sheets

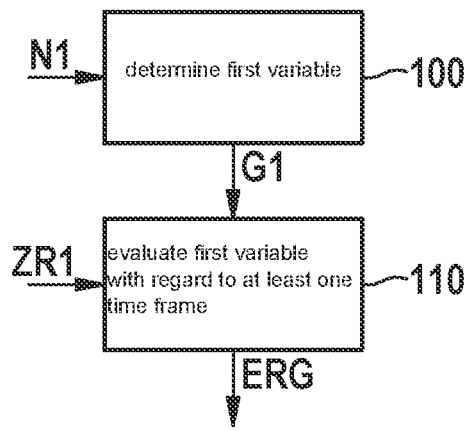
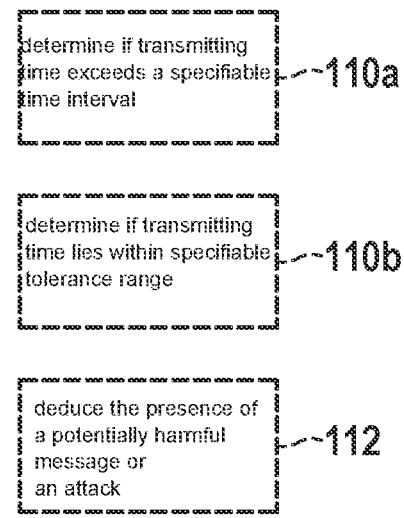
Fig. 1A
Fig. 1B
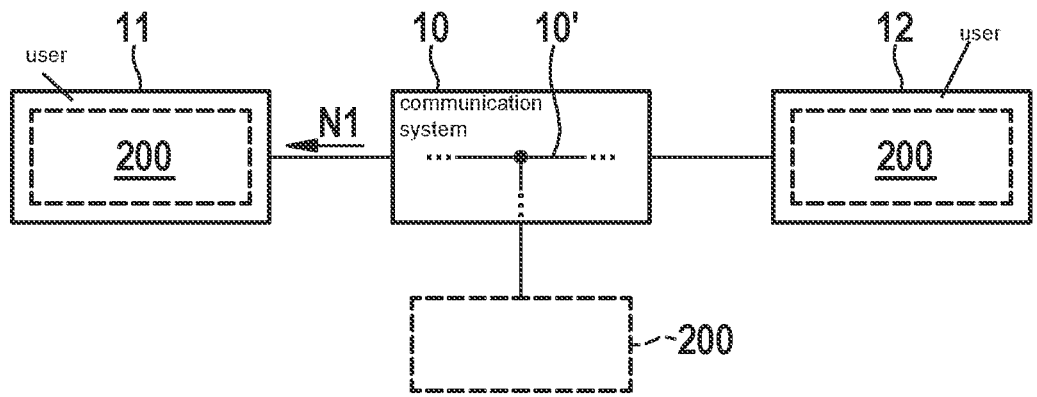
Fig. 2

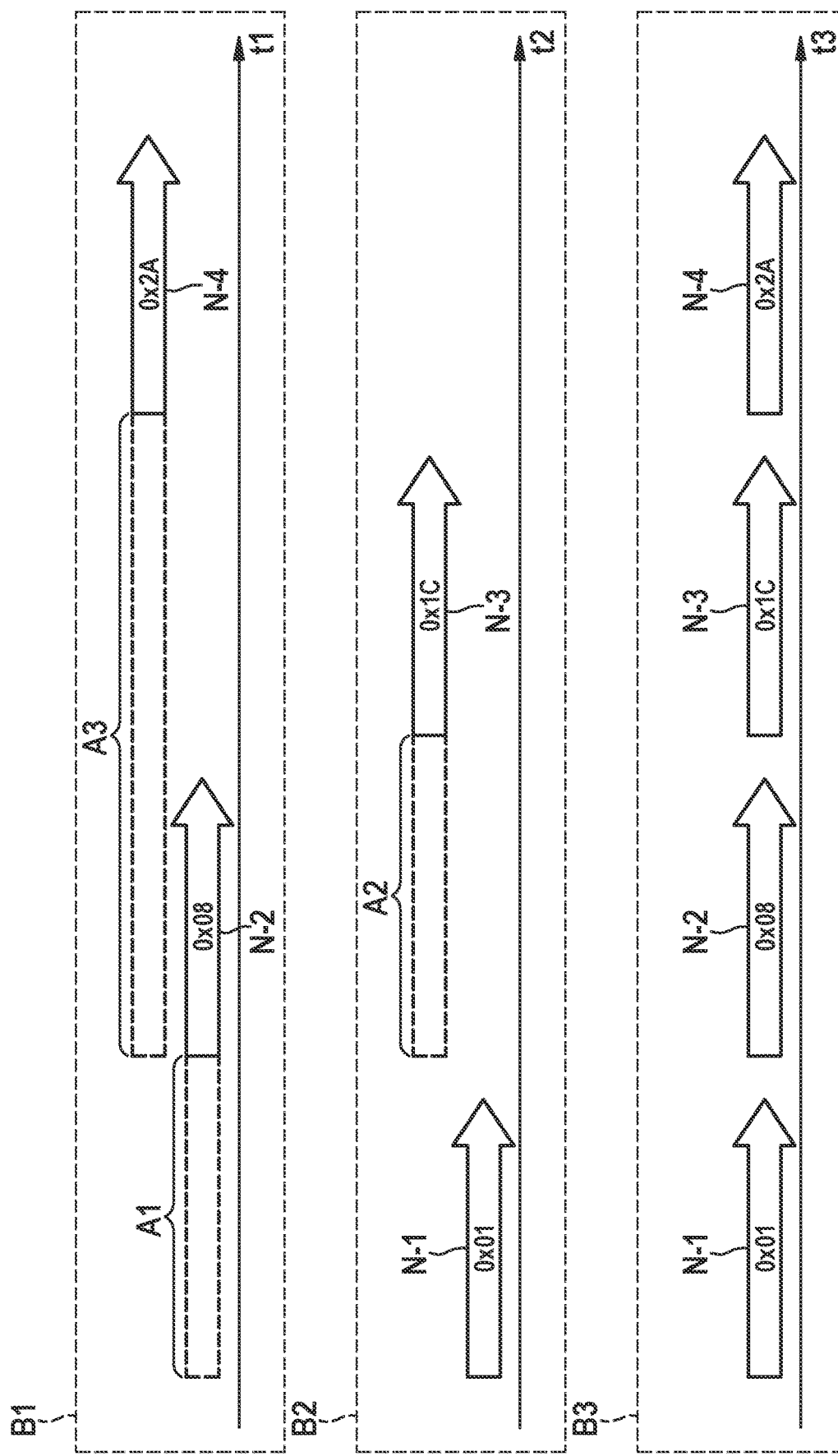

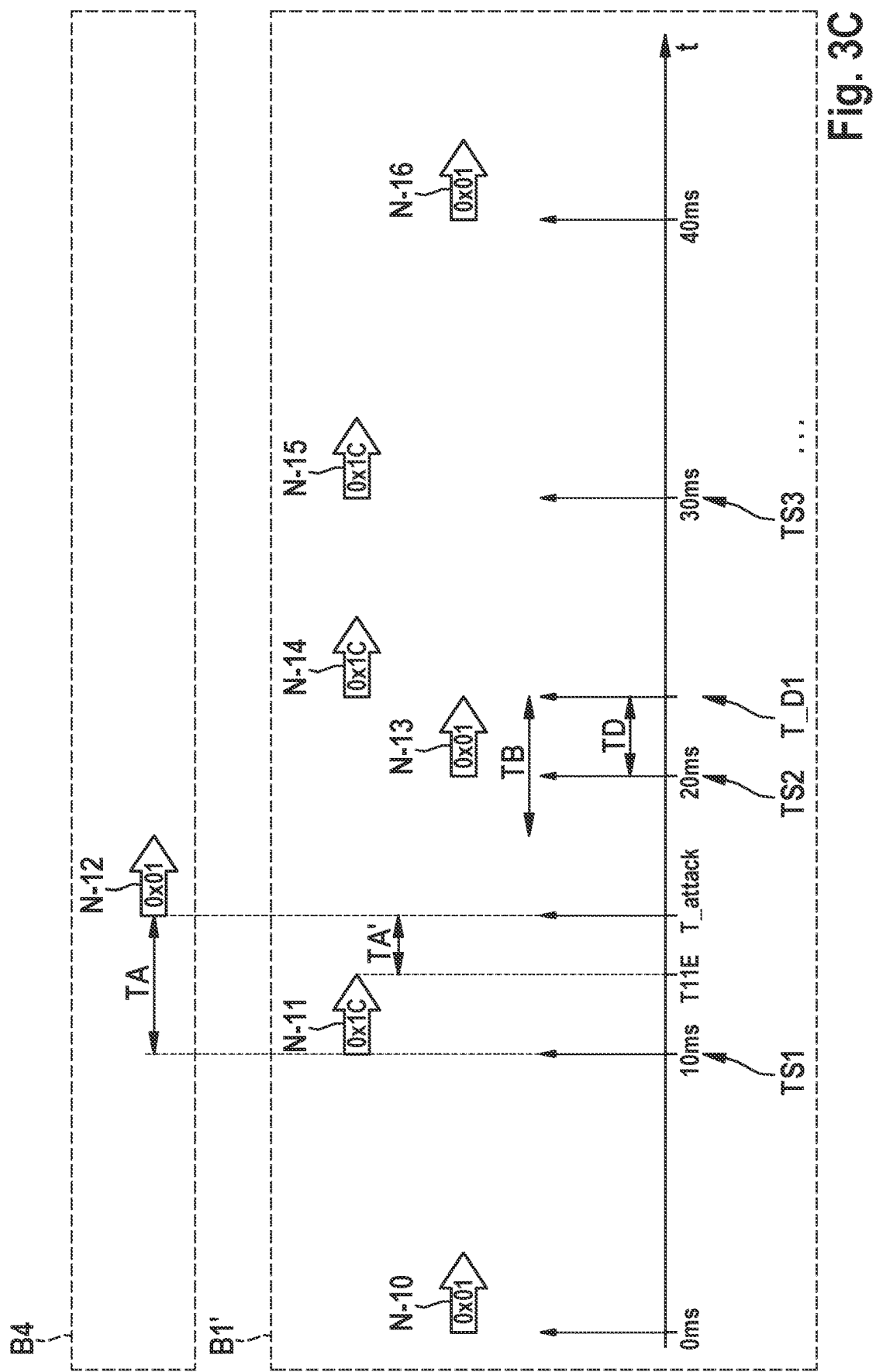

METHOD AND DEVICE FOR PROCESSING DATA ASSOCIATED WITH A MESSAGE RECEIVED VIA A COMMUNICATIONS SYSTEM

CROSS REFERENCE

The present application claims the benefit under 35 U.S.C. § 119 of German Patent Application No. DE 102020211719.5 filed on Sep. 18, 2020, which is expressly incorporated herein by reference in its entirety.

BACKGROUND INFORMATION

The present invention relates to a method for processing data, which are associated with at least one message received via a communications system.

The present invention further relates to a device for processing data, which are associated with at least one message received via a communications system.

SUMMARY

Examples of specific embodiments of the present invention relate to a method, in particular, computer-implemented method, for processing data, which are associated with at least one message received via a communications system, such as a bus system; the method including: determining a first variable, which characterizes a transmitting time of the at least one message; evaluating the first variable with regard to at least one time frame of possible transmitting times of the at least one message.

In further examples of specific embodiments of the present invention, a transmitter of the message may use, e.g., a real-time-capable operating system, which executes its tasks in cyclical patterns having different rates of repetition. Common repetition rates include, for example, 10 ms (milliseconds), 20 ms, 50 ms and 100 ms. In further examples of specific embodiments, a communication driver, which is, e.g., responsible for transmitting the message, may also be implemented in such a pattern. In further examples of specific embodiments, even messages that are supposedly acyclic, e.g., based on events (event basis), may only be called up, that is, transmitted via the communications system, with a next variant of the pattern.

In further examples of specific embodiments of the present invention, if a message deviates too sharply from the time frame, e.g., in spite of neglecting possible effects caused by the system, it may then be deduced that this message constitutes a possible attack. In further examples of specific embodiments, such an attack may be detected, e.g., by evaluating the first variable with regard to the at least one time frame of possible transmitting times of the at least one message.

In further examples of specific embodiments of the present invention, the evaluating includes: determining if the transmitting time of the at least one message exceeds a specifiable time interval from a) a possible transmitting time of the at least one time frame, and/or b) an end of a previous message; and, optionally, deducing the presence of a potentially harmful message and/or an attack on the basis of the determination.

In further examples of specific embodiments of the present invention, the evaluating includes: determining if the transmitting time of the at least one message lies within a specifiable tolerance range of a possible transmitting time of the at least one time frame.

In further examples of specific embodiments of the present invention, the method further includes: determining the at least one time frame based on a priori knowledge that includes, for example, messages recorded earlier (and/or documentation regarding possible transmitters of the message(s)); and/or determining the at least one time frame based on messages received, for example, during operation of a device executing the method.

In further examples of specific embodiments of the present invention, the method further includes: determining a smallest common time frame of possible transmitting times of transmitters transmitting a plurality of messages via the communications system.

In further examples of specific embodiments of the present invention, the method further includes: taking into account a temporal shift of transmitting times of messages with regard to a time frame; the temporal shift being caused, for example, by arbitration events.

In further examples of specific embodiments of the present invention, the method further includes: taking into account a strategy of at least one transmitter transmitting messages via the communications system, for example, with regard to an order of transmission of a plurality of messages of the transmitter.

Further examples of specific embodiments of the present invention relate to a device for executing the method according to the specific embodiments.

Further examples of specific embodiments of the present invention relate to a computer-readable storage medium according to the specific embodiments.

Further specific embodiments of the present invention relate to a computer program, including commands that, in response to the execution of the program by a computer, cause it to carry out the method according to the specific embodiments.

Further examples of specific embodiments of the present invention relate to a data-carrier signal, which transmits and/or characterizes the computer program according to the specific embodiments.

Further examples of the specific embodiments of the present invention relate to a communications system including at least one device according to the specific embodiments. In further examples of specific embodiments of the present invention, the communications system takes the form of, for example, a bus system, e.g., a CAN bus system, in which a plurality of stations may transmit and/or receive messages over a transmission medium. In further examples of specific embodiments, the communications system includes a plurality of subsystems and/or bus systems or other systems suitable for exchanging messages, which may be coupled to each other, e.g., with the aid of at least one station (e.g., gateway).

Further examples of specific embodiments of the present invention relate to use of the method according to the specific embodiments and/or of the device according to the specific embodiments and/or of the computer-readable storage medium according to the specific embodiments and/or of the computer program according to the specific embodiments and/or of the data-carrier signal according to the specific embodiments and/or of the communications system according to the specific embodiments, for at least one of the following elements: a) processing data, which are associated with at least one message received via the communications system, for example, transmitting times of receivable and/or received messages; b) detecting attacks, e.g., by cyclical and/or acyclic messages, which are transmitted via the communications system; c) upgrading current devices, such as control units, for transmitting and/or receiving messages with the aid of the communications system.

Further examples of specific embodiments of the present invention are derived from the description below and the figures.

BRIEF DESCRIPTION OF THE DRAWINGS

FIG. 1A shows a simplified flow chart according to examples of specific embodiments of the present invention.

FIG. 1B shows a simplified flow chart according to further examples of specific embodiments of the present invention.

FIG. 2 shows a simplified block diagram according to further examples of specific embodiments of the present invention.

FIG. 3B shows a simplified timing diagram according to further examples of specific embodiments of the present invention.

FIG. 3C shows a simplified timing diagram according to further examples of specific embodiments of the present invention.

DETAILED DESCRIPTION OF EXAMPLE EMBODIMENTS

Figure 3A:
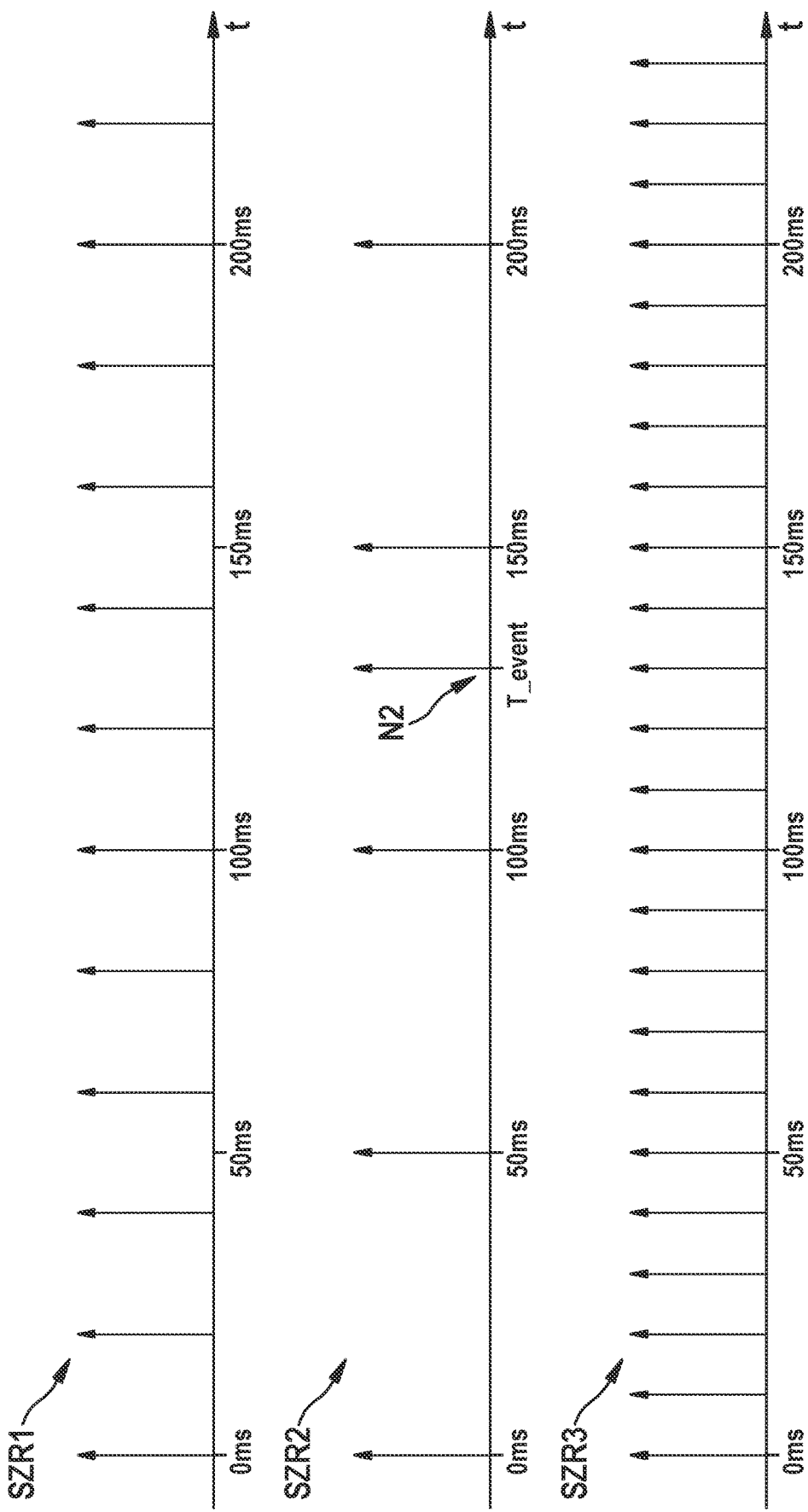
FIG. 3A shows a simplified timing diagram including a first transmitting time frame according to further examples of specific embodiments of the present invention.

Examples of specific embodiments of the present invention, cf. FIG. 1A and FIG. 2, relate to a method, in particular, computer-implemented method, for processing data, which are associated with at least one message N1 received via a communications system 10, such as a bus system; the method including: determining 100 (FIG. 1A) a first variable G1, which characterizes a transmitting time of the at least one message N1; evaluating 110 first variable G1 with regard to at least one time frame ZR1 of possible transmitting times of the at least one message N1. In further examples of specific embodiments, during evaluation 110, a result ERG is obtained, which may be used, e.g., for assessing the question as to whether the at least one message N1 constitutes a proper message of a valid transmitter 12 of communications system 10 or possibly a manipulated message and/or message fed into communications system 10 by an attacker.

FIG. 2 shows communications system 10, in which by way of example, two users 11, 12 may exchange (transmit and/or receive) messages via a transmission medium 10'. For example, communications system 10 may be a CAN bus system having a differential transmission medium 10'.

In further examples of specific embodiments of the present invention, a device 200 configured to execute the method according to the specific embodiments and/or a corresponding functionality, e.g., in at least one of users 11, 12, and/or outside of users 11, 12, e.g., in the form of a separate device 200, may be provided.

In further examples of specific embodiments of the present invention, a transmitter 12 of message N1 may use, e.g., a real-time-capable operating system, which executes its tasks in cyclical patterns at different rates of repetition. Common repetition rates include, for example, 10 ms (milliseconds), 20 ms, 50 ms and 100 ms. In further examples of specific embodiments of the present invention, a communication driver, which is, e.g., responsible for transmitting the message, may also be implemented in such a pattern. In further examples of specific embodiments, even messages that are supposedly acyclic, e.g., based on events (event basis), may only be initiated, that is, transmitted via communications system 10, with a next variant of the pattern.

In further examples of specific embodiments of the present invention, if a message N1 deviates overly sharply from the time frame, e.g., in spite of neglecting possible effects caused by the system, it may then be deduced that this message N1 constitutes a possible attack. In further examples of specific embodiments, such an attack may be detected, e.g., by evaluating 110 (FIG. 1A) first variable G1 with regard to the at least one time frame ZR1 of possible transmitting times of the at least one message N1, e.g., based on result ERG.

In further examples of specific embodiments of the present invention, there are a plurality of options for, e.g., obtaining a value for the smallest common time frame for a transmitter 12 of messages, e.g., a control unit 12. In further examples of specific embodiments, e.g., known information items may be obtained directly from a manufacturer and/or configurator of control unit 12.

In further examples of specific embodiments of the present invention, the time frame may be computed in advance, e.g., offline, e.g., using a recorded network communication, which includes a plurality of messages exchanged since then via communications system 10 and/or data derived from them, and/or computed during use (online), e.g., of control unit 12.

FIG. 3A shows an example of possible transmitting time frames SZR1, SZR2 of two messages, e.g., of the same control unit 12 (FIG. 2), having different cycle times. A first transmitting time frame SZR1 has a period of 10 ms. In further examples of specific embodiments (not shown), the time frame could also be defined to be more rapid, for example, 2 ms. A second transmitting time frame SZR2 has a period of 50 ms.

In further examples of specific embodiments of the present invention, all of the messages of this control unit 12 "appear" theoretically at the times of common pattern SZR3, e.g. on transmission medium 10' (and/or for reception, e.g., by user 11, with the addition of a signal propagation time over transmission medium 10', which, for example, in some specific embodiments, may be neglected or even taken into account).

In further examples of specific embodiments of the present invention, an additional, acyclic transmission of a message N2 at time T_event is oriented on common time frame SZR2, SZR3, as well.

In further examples of specific embodiments of the present invention, messages N1, N2 on a bus 10' behave, in practice, in a far more complex manner than illustratively represented in FIG. 3A. In further examples of specific embodiments, it is possible for messages to not be able to be transmitted simultaneously and, in some instances, to often have different lengths among themselves and, consequently, different transmission durations, as well.

In addition, in further examples of specific embodiments of the present invention, collision avoidance is achieved by prioritizing in an arbitration phase. As shown, e.g., in FIG. 3B, messages N-1 having a lower ID, which corresponds, e.g., to a higher priority (e.g., in a CAN bus system), win the arbitration and are transmitted prior to messages N-2, N-3, N-4 having a higher ID.

Block B1 from FIG. 3B symbolizes, for example, messages N-2, N-4 of a first control unit, block B2 symbolizes, for example, messages N-1, N-3 of a second control unit, and block B3 symbolizes the temporal position of messages N-1, . . . , N-4 with respect to each other on the bus system, as results, e.g., from the above-mentioned prioritization by arbitration. Time axes t1, t2, t3 each have the same scale. Reference character A1 symbolizes a waiting time of the first control unit to transmit message N-2, reference character A2 symbolizes a waiting time of the second control unit to transmit message N-3, and reference character A3 symbolizes a waiting time of the first control unit to transmit message N-4.

In further examples of specific embodiments of the present invention, "displacement" of messages is taken into consideration, e.g., in the arbitration phase. A further characteristic, which, in further examples of specific embodiments of the present invention, may be utilized by the method according to the specific embodiments, is the order of messages N-2, N-4 of the same control unit B1. Since, in further examples of specific embodiments, the arbitration only applies to, in each instance, messages on the bus, but not, e.g., within a control unit, the order may behave correspondingly differently. In further examples of specific embodiments, e.g., operating systems for control units B1, B2 may use different strategies, in order to process internal messages and, in the next step, to transmit them, e.g., to a controller (not shown) for transmission on bus 10'. In further examples of specific embodiments, examples of such strategies include the following: according to priority, transmitting pattern, or temporal appearance (e.g., first come, first serve).

An example of an attack by an attacker (hacker) is shown in FIG. 3C. Control unit B1' transmits the cyclical message having ID "0x01," e.g., as expected, in accordance with the smallest common transmitting pattern of, e.g., 10 ms, cf. reference characters N-10, N-13, N-16. The acyclic message having ID "0x1C" is also transmitted, using the same transmitting time frame of 10 ms, cf. reference characters N-11, N-14, N-15. At time T_D1, message N-14 having ID "0X1C" is transmitted directly after the message N-13 having ID "0x01" (time interval TD from a possible transmission time TS2 according to the time frame) and may therefore still be associated with the transmitting pattern of 10 ms. However, at time T_attack, message N-12 having ID "0x1C" is transmitted by hacker B4. Since T_attack clearly does not conform with the, e.g., present 10 ms transmitting time frame of control unit B1', this message N-12 may be detected as an attack in further examples of specific embodiments. To this end, for example, the first variable G1 (FIG. 1A) associated with message N-12 may be evaluated in accordance with step 110; for example, a time interval TA of time T_attack from previous time frame value TS1 or a time interval TA' of time T_attack from an end THE of a transmission of a previous message N-11 being evaluated, e.g. for exceedance of a respective, specifiable maximum value.

Consequently, in further examples of specific embodiments of the present invention, one or more of the following features of a protocol and/or of transmitters B1, B2, B1', B4 and/or their operating systems may be used, in order to detect, e.g., attacks by cyclic and/or acyclic messages, using, e.g., their temporal behavior: —smallest common transmitting time frame SZR3 (FIG. 3C), e.g., of each control unit, in order to, e.g., check a source B4' of messages N-12 for conformance with and/or deviation from transmitting time frame SZR3; —taking into account the displacement of messages N-14 in the arbitration phase, in order to prevent instances of false detection; —strategy of each control unit for the internal processing of messages, e.g., in order to further check the order on bus 10'.

In further examples of specific embodiments of the present invention, FIG. 1B, the evaluating 110 (FIG. 1A) includes: determining 110a, if transmitting time T_attack of the at least one message N-12 (FIG. 3C) exceeds a specifiable time interval TA from a possible transmitting time TS1, TS2, TS3 of the at least one time frame.

In further examples of specific embodiments of the present invention, FIG. 1B, the evaluating 110 (FIG. 1A) includes: determining 110a if transmitting time T_attack of the at least one message N-12 (FIG. 3C) exceeds a specifiable time interval TA' from an end THE of a preceding message N-11; and, optionally, deducing 112 the presence of a potentially harmful message N-12 and/or an attack on the basis of determination 110A.

In further examples of specific embodiments of the present invention, the evaluating 110 (FIG. 1A) includes: determining 110b (FIG. 1B) if transmitting time T_attack of the at least one message N-12 lies within a specifiable tolerance range TB of a possible transmitting time TS2 of the at least one time frame.

Figure 4:
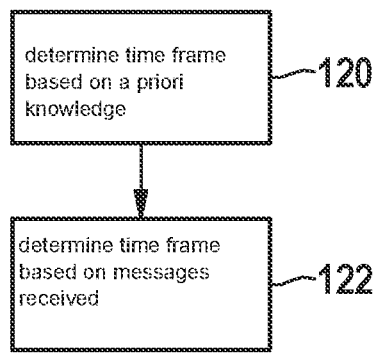
FIG. 4 shows a simplified flow chart according to further examples of specific embodiments of the present invention.

In further examples of specific embodiments of the present invention, FIG. 4, the method further includes: determining 120 the at least one time frame ZR1 based on a priori knowledge that includes, for example, messages recorded earlier (and/or documentation regarding possible transmitters 11, 12 (FIG. 2) of the message(s)); and/or determining 122 (FIG. 4) the at least one time frame ZR1 based on messages received, for example, during operation of a device 12 executing the method.

Figure 5:
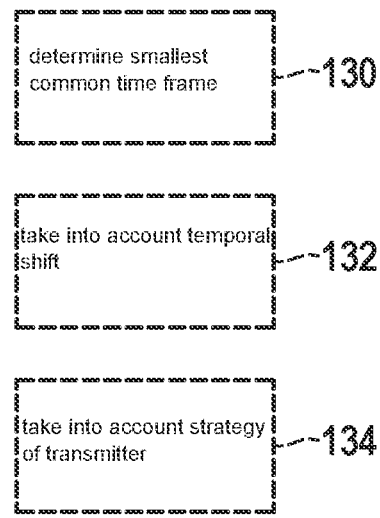
FIG. 5 shows a simplified flow chart according to further examples of specific embodiments of the present invention.

In further examples of specific embodiments of the present invention, FIG. 5, the method further includes: determining 130 a smallest common time frame SZR3 (FIG. 3B) of possible transmitting times of transmitters 11, 12 transmitting a plurality of messages via communications system 10.

In further examples of specific embodiments of the present invention, the method further includes: taking into account 132 a temporal shift A1 (FIG. 3B), TD (FIG. 3C) of transmitting times T_D1 of messages N-2, N-14 with regard to a time frame TS2; the temporal shift TD being caused, for example, by arbitration events.

In further examples of specific embodiments of the present invention, FIG. 5, the method further includes: taking into account 134 a strategy of at least one transmitter 11, 12 transmitting messages via communications system 10, for example, with regard to an order of transmission of a plurality of messages of the transmitter.

Figure 6:
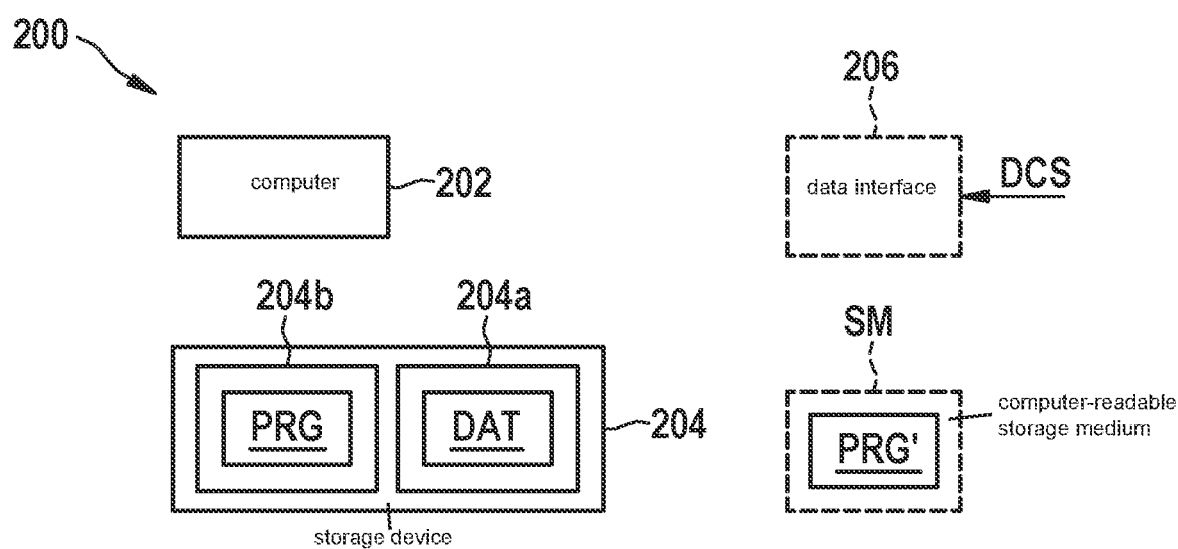
FIG. 6 shows a simplified block diagram according to further examples of specific embodiments of the present invention.

Further examples of specific embodiments of the present invention, FIG. 6, relate to a device 200 for executing the method according to the specific embodiments. In further preferred specific embodiments, device 200 includes: a computing device 202 ("computer"), a storage device 204 assigned to computing device 202, for at least temporarily storing at least one of the following elements: a) data DAT, b) computer program PRG, in particular, for executing the method according to the specific embodiments.

In further preferred specific embodiments of the present invention, data DAT may include messages N1 received at least intermittently and/or partially, and/or first variable G1, and/or result ERG (FIG. 1A).

In further preferred specific embodiments of the present invention, the storage device includes a volatile memory 204a (e.g., working memory (RAM)) and/or a nonvolatile memory 204b (e.g., Flash-EEPROM).

In further examples of specific embodiments of the present invention, computing device 202 may include at least one of the following elements: microprocessor (μP), microcontroller (μC), application-specific integrated circuit (ASIC), system on chip (SoC), programmable logic chip (e.g., field programmable gate array (FPGA)), hardware circuit, graphics processor (graphics processing unit (GPU)), or any desired combinations of them.

Further examples of specific embodiments of the present invention relate to a computer-readable storage medium SM, including commands PRG' that, in response to execution by a computer 202, cause it to carry out the method according to the specific embodiments.

Further examples of specific embodiments of the present invention relate to a computer program PRG, including commands that, in response to the execution of the program by a computer 202, cause it to carry out the method according to the specific embodiments.

Further examples of specific embodiments of the present invention relate to a data-carrier signal DCS, which characterizes and/or transmits computer program PRG according to the specific embodiments. Data-carrier signal DCS is receivable, for example, via an optional data interface 206 of device 200; in further examples of specific embodiments, e.g., message N1 also being receivable via the data interface.

In further examples of specific embodiments of the present invention, device 200 and/or its functionality is integrated in at least one user 11, 12 (FIG. 2) of communications system 10. In further examples of specific embodiments, device 200 may also be implemented outside of a user 11, 12.

Further examples of the specific embodiments of the present invention, FIG. 2, relate to a communications system 10 including at least one device 200 according to the specific embodiments. In further examples of specific embodiments, communications system 10 takes the form of, for example, a bus system, e.g., a CAN bus system, in which a plurality of stations 11, 12 may transmit and/or receive messages N1 over a transmission medium 10'. In further examples of specific embodiments, communications system 10 includes a plurality of subsystems and/or bus systems or other systems suitable for exchanging messages, which may be coupled to each other, e.g., with the aid of at least one station (e.g., gateway).

Figure 7:
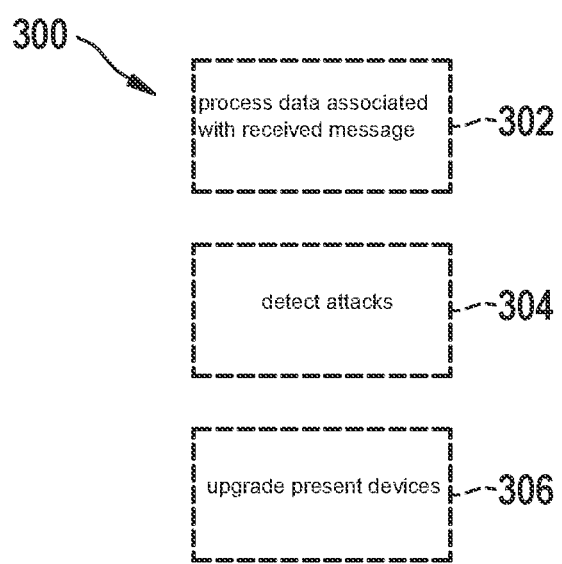
FIG. 7 shows aspects of uses according to further examples of specific embodiments of the present invention.

Further examples of specific embodiments of the present invention, FIG. 7, relate to use 300 of the method according to the specific embodiments and/or of the device according to the specific embodiments and/or of the computer-readable storage medium according to the specific embodiments and/or of the computer program according to the specific embodiments and/or of the data-carrier signal according to the specific embodiments and/or of the communications system according to the specific embodiments, for at least one of the following elements: a) processing 302 data, which are associated with at least one message N1 received via communications system 10, for example, transmitting times of receivable and/or received messages N1; b) detecting 304 attacks, e.g., by cyclical and/or acyclic messages N-12, which are transmitted via communications system 10; c) upgrading 306 present devices 11, 12, such as control units, for transmitting and/or receiving messages with the aid of the communications system 10.

In further examples of specific embodiments of the present invention, the principle according to the specific embodiments may be used, e.g., for an intrusion detection system, that is, a system for detecting attacks, e.g., on a communications system 10.

In further examples of specific embodiments of the present invention, messages of different buses 10' of the same control unit may be checked among themselves. In further examples of specific embodiments, messages may be grouped and, e.g., associated with a common control unit, if, e.g., an association of messages with the corresponding control units is (presently) unknown.

What is claimed is:

1. A computer-implemented method for processing data which are associated with at least one message received via a communications system, comprising:
   determining a first variable which characterizes a transmitting time of the at least one message;
   evaluating the first variable with regard to at least one time frame of possible transmitting times of the at least one message;
   determining a smallest common time frame of possible transmitting times of each transmitter of a plurality of transmitters transmitting a plurality of messages via the communications system, at least one of the transmitters being configured to transmit messages at at least two different cycle times, the smallest common time frame of each of the at least one of the transmitters being common to the possible transmitting times of the messages transmitted at the at least two different cycle times; and
   deducing a presence of the potentially harmful message on the communication system and/or an attack on the communications system, wherein the deducing is based the evaluation, and the deducing takes into account at least one of the determined smallest common time frames.

2. The method as recited in claim 1, wherein the communications system is a bus system.

3. The method as recited in claim 1, wherein the evaluating includes: determining if the transmitting time of the at least one message lies within a specifiable tolerance range of a possible transmitting time of the at least one time frame.

4. The method as recited in a claim 1, further comprising:
   determining the at least one time frame based on a priori knowledge that includes messages recorded earlier, and/or determining the at least one time frame based on messages received during operation of a device executing the method.

5. The method as recited in claim 1, further comprising:
   taking into account a temporal shift of transmitting times of messages with regard to a time frame.

6. The method as recited in claim 5, wherein the temporal shift is caused by arbitration events.

7. The method as recited in claim 1, wherein the method is used at least one of the following: a) processing data which are associated with the at least one message received via the communications system, b) detecting attacks which are transmitted via the communications system, c) upgrading present devices configured to transmit and/or receive messages using the communications system.

8. A device for processing data which are associated with at least one message received via a communications system, the device comprising:
   a computer and a storage device, the computer being configured to:

determine a first variable which characterizes a transmitting time of the at least one message;

evaluate the first variable with regard to at least one time frame of possible transmitting times of the at least one message;

determine a smallest common time frame of possible transmitting times of each transmitter of a plurality of transmitters transmitting a plurality of messages via the communications system, at least one of the transmitters being configured to transmit messages at at least two different cycle times, the smallest common time frame of each of the at least one of the transmitters being common to the possible transmitting times of the messages transmitted at the at least two different cycle times; and deduce a presence of a potentially harmful message on the communication system and/or an attack on the communications system, wherein the deducing is based on the evaluation, and the deducing takes into account at least one of the determined smallest common time frames.

9. A non-transitory computer-readable storage medium on which are stored commands for processing data which are associated with at least one message received via a communications system, the commands, when executed by a computer, causing the computer to perform the following steps:

determining a first variable which characterizes a transmitting time of the at least one message;

evaluating the first variable with regard to at least one time frame of possible transmitting times of the at least one message;

determine a smallest common time frame of possible transmitting times of each transmitter of a plurality of transmitters transmitting a plurality of messages via the communications system, at least one of the transmitters being configured to transmit messages at at least two different cycle times, the smallest common time frame of each of the at least one of the transmitters being common to the possible transmitting times of the messages transmitted at the at least two different cycle times; and deducing a presence of a potentially harmful message on the communication system and/or an attack on the communications system, wherein the deducing is based on the evaluation, and the deducing takes into account at least one of the determined smallest common time frames.

10. A communications system, comprising:

a device for processing data which are associated with at least one message received via the communications system, the device configured to:

determine a first variable which characterizes a transmitting time of the at least one message;

evaluate the first variable with regard to at least one time frame of possible transmitting times of the at least one message;

determine a smallest common time frame of possible transmitting times of each transmitter of a plurality of transmitters transmitting a plurality of messages via the communications system, at least one of the transmitters being configured to transmit messages at at least two different cycle times, the smallest common time frame of each of the at least one of the transmitters being common to the possible transmitting times of the messages transmitted at the at least two different cycle times; and deduce a presence of a potentially harmful message on the communication system and/or an attack on the communications system, wherein the deducing is based on the evaluation, and the deducing takes into account at least one of the determined smallest common time frames.

* * * * *